United States Patent [19]

Lines

[11] Patent Number: 5,146,534
[45] Date of Patent: Sep. 8, 1992

[54] SIO₂-BASED ALKALI-DOPED OPTICAL FIBER

[75] Inventor: Malcolm E. Lines, Millington, N.J.

[73] Assignee: AT&T Bell Laboratories, Murray Hill, N.J.

[21] Appl. No.: 790,836

[22] Filed: Nov. 12, 1991

[51] Int. Cl.⁵ ............................................. G02B 6/16
[52] U.S. Cl. ............................................. 385/142
[58] Field of Search ............... 385/142, 141, 123, 124; 501/35, 37, 52, 57, 55, 72

[56] References Cited

U.S. PATENT DOCUMENTS

| | | | |
|---|---|---|---|
| 3,971,645 | 7/1976 | Bachmann et al. | 385/123 |
| 4,275,951 | 6/1981 | Beales et al. | 385/124 |
| 4,277,270 | 7/1981 | Krohn | 385/124 |
| 4,666,247 | 5/1987 | MacChesney et al. | 350/96.34 |

OTHER PUBLICATIONS

"Rayleigh and Brillouin Scattering in $K_2O$-$SiO_2$ Glasses", by J. Schroeder et al., *Journal of The American Ceramic Society*, vol. 56, No. 10, pp. 510–514, Oct. 1973.
"Treatise on Materials Science and Technology", vol. 12, M. Tomozawa et al., editors, *Academic Press*, 1977, pp. 183–184.

*Primary Examiner*—John D. Lee
*Assistant Examiner*—John Ngo
*Attorney, Agent, or Firm*—E. E. Pacher

[57] ABSTRACT

It has been discovered that glass of composition $xM_2O.(1-x)SiO_2$ can have lower intrinsic loss than pure $SiO_2$, for $0 < x \lesssim 0.03$ and M=Na, K, and/or Rb. Furthermore, it has been discovered that co-doping with F can increase the range of reduced intrinsic loss to $x \sim 0.07$, for M=K and/or Rb. Disclosed is optical fiber that comprises the novel low intrinsic loss glass,, typically in the core.

8 Claims, 3 Drawing Sheets

SiO$_2$-BASED ALKALI-DOPED OPTICAL FIBER

FIELD OF THE INVENTION

This invention pertains to SiO$_2$-based optical communication fiber.

BACKGROUND OF THE INVENTION

The last few years have seen astonishing progress in the field of optical fiber communications. For instance, low loss (e.g., about 0.3 db/km) silica-based optical fiber, the transmission medium of present choice, is now routinely produced. In fact, silica-based single mode fiber whose loss is only a few hundredths db/km above the theoretical minimum has been achieved.

Fiber loss is a parameter of great economic significance since it determines, for instance, the maximum distance between amplifiers or repeaters in a given transmission path. Thus it is highly desirable to have available fiber of the lowest possible loss. It is well known that optical fiber comprises a core of relatively high refractive index that is contactingly surrounded by a cladding having relatively low refractive index.

It is known that some non-SiO$_2$-based glasses (e.g., fluoride and high-alkali alumino-silicate glasses) could have lower loss than SiO$_2$ if they could be manufactured in sufficient purity. To date, however, this has not been possible. Furthermore, such fibers likely would demand treatment and procedures that differ radially from those now established in the industry.

It is generally accepted in the art that the addition of a small amount of alkali metal oxide to vitreous SiO$_2$ raises the total intrinsic attenuation of the resulting glass above that of pure SiO$_2$ (which is now known to be about 0.15 db/km at $\lambda = 1.55 \mu m$). See, for instance Y. Schroeder et al., *Journal of the American Ceramic Society*, Vol 56(10), pp. 510-514, especially FIG. 2, which shows a large peak in the Landau-Placzek ratio for low concentrations of K$_2$O in SiO$_2$. See also "Treatise on Materials Science and Technology", Vol. 12, M. Tomozawa et al, editors, Academic Press 1977, especially pages 183 and 184, which show similar data for K-doped (FIG. 5) and Na-doped (FIG.6) SiO$_2$.

U.S. Pat. No. 4,666,247 (incorporated herein by reference) discloses SiO$_2$-based optical fiber comprising a "modifier" chosen from Li, Na, K, Rb, Cs, Be, Mg, Ca, Sr, Ba, and the rare earths, and further comprising a "homogenizer" chosen from B, Al, Ga, In, P, As and Sb. The patent teaches that the presence of the homogenizer permits achievement of relatively high modifier concentrations that lead to phase separation or crystallization in prior art fibers. S.R. Nagel et al. (*Journal of the American Ceramic Society*, Vol. 59(1-2), p 47, 1976) describe a technique for making fiber having a potassium silicate core and a silicate cladding, with K serving as the index-raising dopant. The fibers had minimum loss (10 db/km) at about 0.65 $\mu m$ and had relatively large core size (up to 40 $\mu m$ diameter). Consequently, the fibers were not single mode fibers at any of the wavelengths disclosed in the paper.

For the above discussed and other reasons it would be highly desirable to have available optical fiber that has a lower intrinsic loss than prior art SiO$_2$-based fiber at the important communications wavelengths of about 1.31 and for 1.55 $\mu m$, but that in all other respects acts substantially the same as the prior art fiber. This application discloses a fiber that can meet these requirements. Typically the fiber is a single mode fiber at the desired operating wavelength.

THE INVENTION

I have made the surprising discovery that, contrary to the expectations of those skilled in the art, some low alkali-concentration vitreous SiO$_2$ can, over a relatively narrow range of alkali content, have lower intrinsic loss than pure vitreous SiO$_2$ at wavelengths of interest for optical communications, e.g., at 1.31 and/or 1.55 $\mu m$. By "intrinsic loss" herein is meant the, even in principle irreducible, optical loss in an ideally pure material. The alkalis that can produce such loss reduction are Na, K and Rb. I have also discovered that co-doping with F can significantly extend the concentration range in which doping with K and Rb can yield loss reduction. Glass of the relevant composition can be produced by, for instance, MCVD (see, for instance, the above reference '247 patent) and advantageously is used in optical fiber, typically in the fiber core.

The unexpected lowering of the minimum intrinsic attenuation by "doping" of SiO$_2$ with a minor amount of an appropriate alkali (or alkalis) is believed to be due to competition between the two dominant scattering loss mechanisms in the glass. These mechanisms are associated with density and concentration fluctuations and give rise to attenuation constants $\alpha_p$ and $\alpha_c$, respectively, which are, for small alkali concentrations, both sensitive functions of the alkali concentration. Other known contributions to the intrinsic scattering loss are Brillouin scattering, Raman scattering, and absorption loss from the multiphonon edge. These however are relatively insensitive to small alkali dopant concentrations at the relevant wavelengths and will not be considered further.

At small alkali dopant concentrations $\alpha_p$ is closely proportional to the glass transition temperature $T_g$ (defined as the temperature at which the melt viscosity is $10^{13}$ poise; at this viscosity level density fluctuations in the melt "freeze in"), which drops precipitously from its pure silica value of about 1450K to less than 1000K for $\sim 1$ mole % of alkali oxide. The effect appears to be approximately independent of alkali metal species.

On the other hand, for small dopant concentrations, $\alpha_c$ is a rapidly increasing function of dopant concentration, with the increase being alkali metal species-sensitive. It is known that, for small x, $\alpha_c$ is proportional to $x(dn_o/dx)^2$, where x is the mole fraction of alkali oxide in the SiO$_2$-based glass and $n_o$ is the refractive index of the glass.

Figure 1:
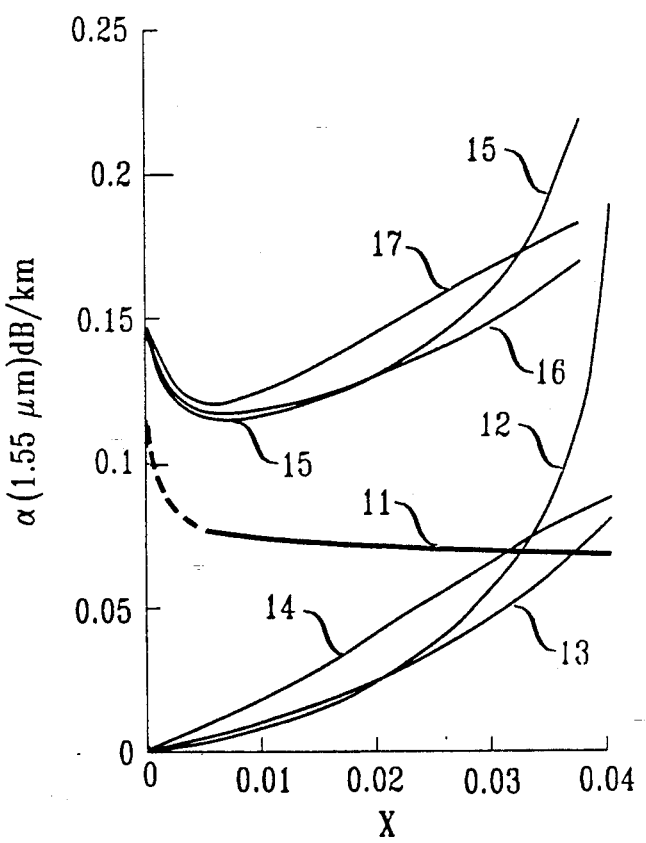
FIG. 1 shows data on attenuation at 1.55 $\mu m$ as a function of mole fraction of alkali metal, for alkali-doped vitreous silica.

It is the competition between these two intrinsic loss mechanisms that is believed to result in a reduced minimum total intrinsic loss near $X \sim 0.01$ for M-doped SiO$_2$, where x is the alkali oxide mole fraction and M is Na, K, or Rb. This is shown in FIG. 1, which shows total intrinsic attenuation ($\alpha$) as a function of x, for $\lambda = 1.55$ $\mu m$. Numeral 11 refers to $\alpha_p$ for M=Na, K, and Rb, and numerals 12, 13 and 14 refer to $\alpha_c$ for Na, K, and Rb, respectively. Numerals 15, 16 and 17 refer to total intrinsic attenuation $\alpha$ for Na, K and Rb, respectively, which includes, in addition to the sum of $\alpha_p$ and $\alpha_c$, an essentially x-independent contribution of about 0.035 db/km for Brillouin, Raman and multiphonon losses. As FIG. 1 shows, total scattering loss of $xM_2O \cdot (1-x)SiO_2$ can be less than that for pure $SiO_2$ for $x \lesssim 0.03$ if M is K, and for somewhat smaller x if M is Na or Rb.

I have also discovered that co-doping vitreous silica with F and K and/or Rb can have beneficial results. In particular, co-doping with fluorine can increase the range of x for which the total scattering loss is less than that of pure $SiO_2$. Thus, a preferred embodiment of the invention is silica-based (i.e., more than 0.8 or even 0.9 mole fraction $SiO_2$) low loss optical fiber whose core comprises $SiO_2$, F, and K and/or Rb, with the F and alkali concentrations selected such that the core material has $\alpha$ less than that of an otherwise identical comparison fiber whose core is essentially alkali-free.

Figure 2:
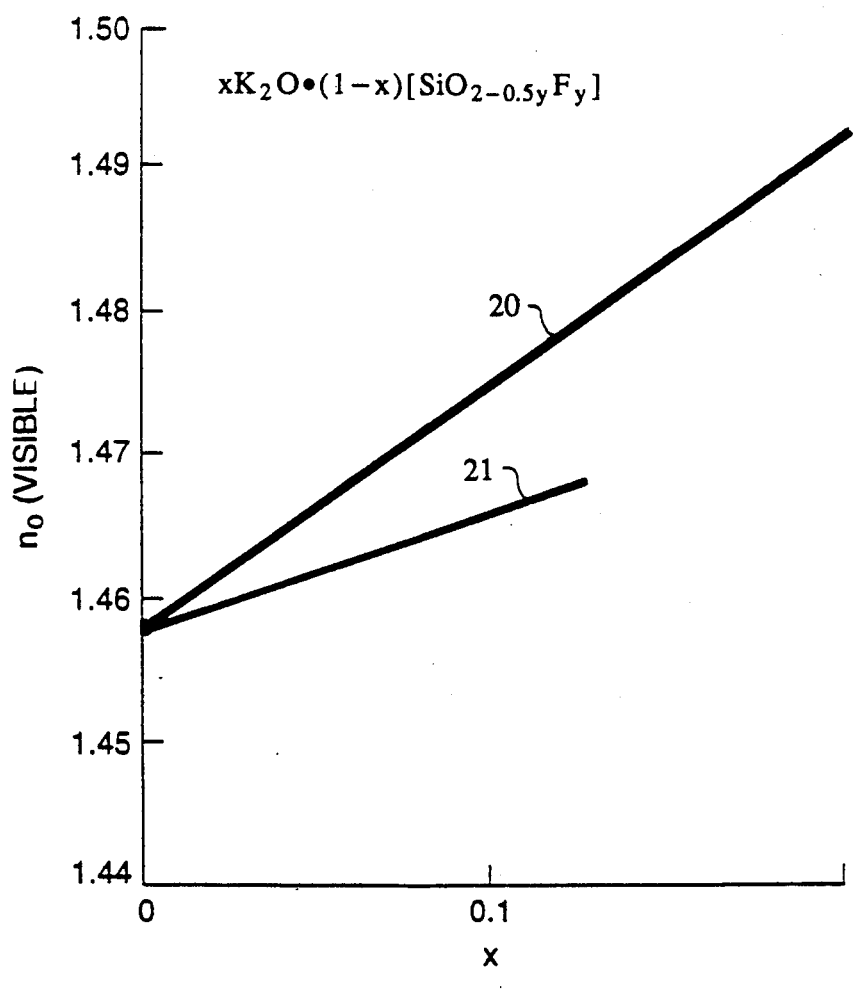
FIG. 2 shows data on refractive index as a function of mole fraction of alkali metal, for F-free K-doped vitreous silica and for exemplary F and K-doped vitreous silica.

It is believed that the primary effect of F on $\alpha$ is through its effect on $\alpha_c$, in particular, through its effect on $dn_o/dx$. FIG. 2 shows exemplary data of refractive index $n_o$ vs. $K_2O$ concentration x, for F-free material (20) and for exemplary F-doped material (21), both for visible light. The F-doped material is of composition $xK_2O \cdot (1-x)[SiO_{2-0.5y}F_y]$. In some preferred embodiments of the invention the F-concentration at least approximately (e.g., within $\pm 25\%$) satisfies the relationship $y = 2x$.

The above theoretical discussion is offered for pedagogical reasons only, and the invention does not depend on the correctness of the offered theoretical explanation.

Figure 3:
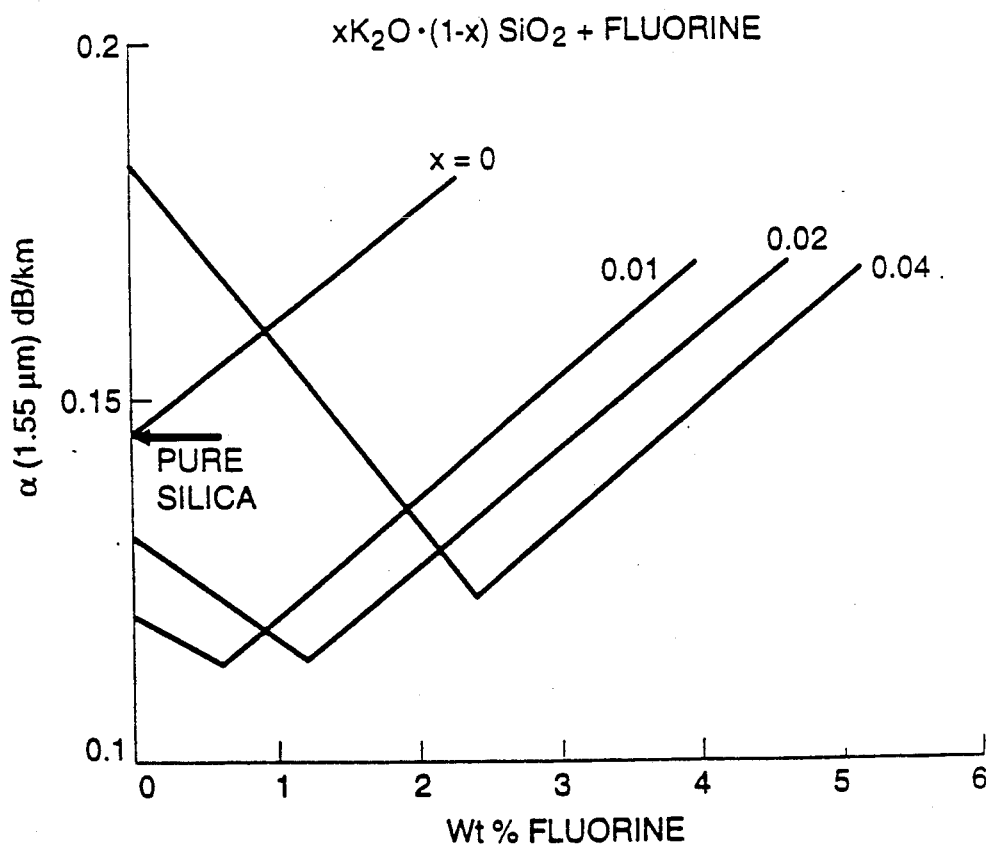
FIG. 3 schematically illustrates the dependence of intrinsic loss on K-and F-concentration

FIG. 3 schematically illustrates the relationship between total intrinsic loss and K- and F-content. As can be deduced from FIG. 3, it will typically not be advantageous to dope the alkali-containing $SiO_2$-based glass with more than about 4 weight % of F. Furthermore, it is generally not advantageous to dope the $SiO_2$ with more than 0.07 mole fraction of the relevant alkali oxide, with less than 0.06 or even 0.05 being frequently preferable.

Those skilled in the art will appreciate that the alkali-doped region (typically the core) of fiber according to the invention may contain, in addition to $SiO_2$, the alkali or alkalis and the optional F, also other dopants such as Ge or Al, as may be required to achieve a desired material parameter, e.g., a predetermined value of core refractive index. However, in a currently most preferred embodiment of the invention the core is doped only with F, K and/or Rb, and the cladding is doped with sufficient F to result in the desired index difference.

It will be appreciated that the above discussion pertains only to intrinsic attenuation, and that, in order to make optical fiber whose total loss is less than that achieved by the relevant prior art fiber, the usual rigorous attention to the elimination of essentially all radiation-absorbing impurities and other non-intrinsic loss mechanisms is required.

EXAMPLE

A 19/25 mm $SiO_2$ preform tube is mounted in conventional MCVD apparatus. A quantity of pre-melted high purity KCl is positioned inside the tube near the inlet end by means of a $SiO_2$ spoon that is held stationary with respect to the apparatus by means that include a rotating seal. The interior surface of the substrate tube is conventionally etched at about 2100° C., using $CF_4$ (120 cm$^3$/min) and $O_2$ (3 l/min) and a back pressure of about 0.56 Torr (~75Pa). Following the etch, the tube is fire polished at about 2100° C. and about the same back pressure ($O_2$ at 3 l/min). Subsequently 10 layers of down-doped ($\Delta^- = 0.08\%$) cladding glass are deposited at about 2100° C. and a back pressure of about 0.75 Torr (~100Pa) by flowing $SiCl_4$ (6.5 g/min), $CF_4$ (125 cm$^3$/min), $POCl_3$ (0.1 g/min), $O_2$ (2.1 l/min), and He (4.3 l/min) into the tube. Cladding deposition is followed by deposition of a single layer of up-doped ($\Delta^+ = 0.25\%$) core glass, at about 2150° C. and a back pressure of about 0.75 Torr (~100Pa), by flowing $SiCl_4$ (0.7 g/min), $GeCl_4$ (0.3 g/min), $O_2$ (630 cm$^3$/min) and He (825 cm$^3$/min) into the tube. After core glass deposition the gas flow into the tube is changed to $O_2$ and $Cl_2$, the $SiO_2$ spoon with the KCl therein is moved further into the tube and heated to a temperature above 770° C., with temperature and flow rates selected to yield the desired K doping level in the core glass. After these adjustments a downstream portion of the tube is collapsed in conventional fashion. Fiber is drawn from the thus produced solid preform rod. The fiber is single mode at 1.31 and 1.55 μm, shows no sign of crystallization or phase separation, has a potassium oxide mole fraction less than 0.03 in the core, and its core has intrinsic loss less than that of an otherwise identical fiber that is essentially alkali-free.

I claim:

1. A silica-based fiber that is a single mode fiber at a predetermined operating wavelength, the fiber comprising a core and a cladding contactingly surrounding the core, the core comprising at least 0.8 mole fraction $SiO_2$, CHARACTERIZED IN THAT
   a) the core further comprises x mole fraction $M_2O$, where M is selected from the group consisting of Na, K, Rb and combinations thereof, and $0 < x \lesssim 0.07$; and
   b) associated with the core is an intrinsic loss at the operating wavelength that is lower than the intrinsic loss associated with the core of an otherwise identical comparison fiber whose core is essentially M-free.

2. Optical fiber according to claim 1, wherein M is selected from the group consisting of K, Rb, K and Rb, and wherein the core further comprises F.

3. Optical fiber according to claim 2, wherein the mole fraction of F is in the range 1.5x to 2.5x.

4. Optical fiber according to claim 1, wherein $x \lesssim 0.03$, and wherein the core is substantially F-free.

5. Optical fiber according to claim 1, wherein the cladding comprises F.

6. Optical fiber according to claim 5, wherein M is selected from the group consisting of K, Rb, and K and Rb, wherein the core consists essentially of Si, M, oxygen and fluorine, and the cladding consists essentially of Si, oxygen and fluorine.

7. Optical fiber of claim 1, wherein the operating wavelength is about 1.3 μm.

8. Optical fiber of claim 1, wherein the operating wavelength is about 1.5 μm.

* * * * *